United States Patent [19]

Schwarzenberg et al.

[11] 4,392,404
[45] Jul. 12, 1983

[54] CUTTING HEAD FOR GLASS CUTTING MACHINE

[75] Inventors: Norbert Schwarzenberg; Heinz Ueberwolf, both of Herzogenrath; Jakob Kaesmacher, Stolberg-Buesbach, all of Fed. Rep. of Germany

[73] Assignee: Saint-Gobain Vitrage, France

[21] Appl. No.: 225,783

[22] Filed: Jan. 16, 1981

[30] Foreign Application Priority Data

Jan. 21, 1980 [DE] Fed. Rep. of Germany ....... 3002071

[51] Int. Cl.³ .................... C03B 33/02; C03B 33/10; B26D 3/08
[52] U.S. Cl. ........................................ 83/886; 83/72; 83/74; 83/881
[58] Field of Search ............... 83/881, 886, 880, 62.1, 83/62, 72, 74

[56] References Cited

U.S. PATENT DOCUMENTS 3,058,220 10/1962 Eary ......................... 33/32
3,742,793 7/1973 Gray et al. ............... 83/881
4,171,657 10/1979 Halberschmidt et al. ........... 83/886
4,210,052 7/1980 Fisher .................... 83/886

Primary Examiner—Donald R. Schran
Attorney, Agent, or Firm—Pennie & Edmonds

[57] ABSTRACT

A cutting head for a glass cutting machine includes a cylinder, a piston movable in the cylinder in one direction to a cutting plane under control of compressed air from a source communicated to the cylinder to act on an upper face and move the piston in opposition to a bias force, a rod attached to and movable with the piston and a cutting wheel carried at the end of the rod for cutting a glass sheet from a glass blank. A port is formed through the wall of the cylinder and means connected to the port responsive to a rapid rise in pressure function rapidly to isolate the cylinder from the source of compressed air and to vent the cylinder. During a cutting operation, the piston seals the port. If the cutting wheel should move beyond the extremes of the glass blank or for any reason move further in the one direction, following movement of the piston shall open the port and the cutting wheel will rapidly retract to and beyond the cutting plane without damage to the cutting wheel.

8 Claims, 1 Drawing Figure

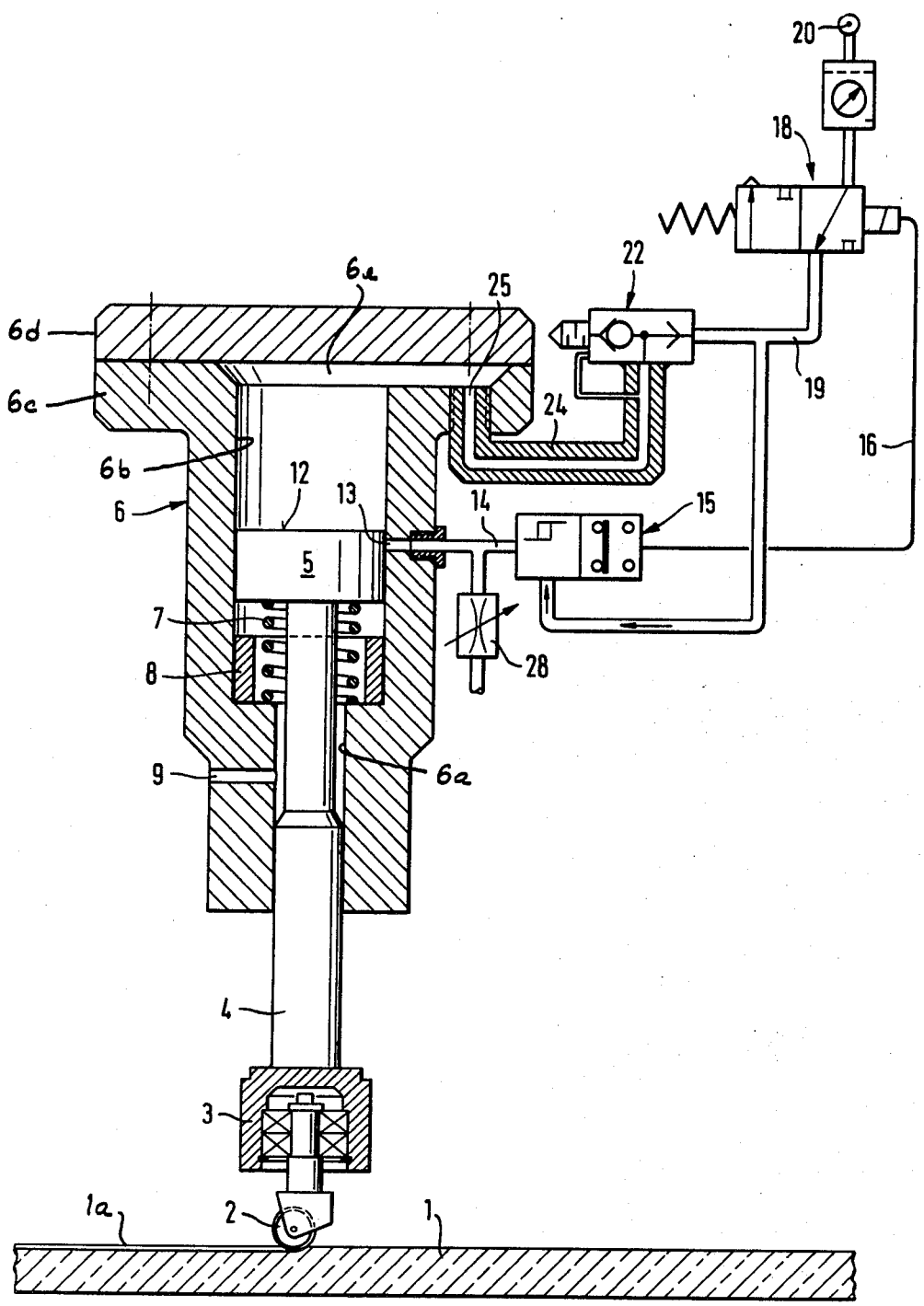

CUTTING HEAD FOR GLASS CUTTING MACHINE

TECHNICAL FIELD

The invention relates to an improvement in apparatus used in the cutting of glass plate, such as automobile glass from a glass blank. Particularly, the invention relates to a cutting head and a supported cutting tool together with structure both for moving the cutting tool in one direction to a working position at a cutting plane whereby the cutting tool may provide a cut along a desired path and retracting the cutting tool rapidly in the opposite direction should the cutting tool move further in the one direction for any reason.

BACKGROUND ART

It is known that a glass plate may be cut from a glass blank by means of apparatus including a cuttting head supporting a cutting tool that is guided along a desired path. For example, it is disclosed in German Offenlegungsschrift No. 27 36 614, that the cutting tool may be supported on a rod connected to and extending from a piston which is movable in a cylinder in one direction to a working position when the cylinder is pressurized and in the opposite direction when the cylinder is vented to atmosphere after making a cut. The cylinder, it is disclosed, is connected to a source of compressed air. Also, it is disclosed in that publication that the cutting head is mounted on cross slides and that cutting head and the cutting tool which it supports is guided either by a template or by electronic control along a desired path.

It is not uncommon that during a cutting operation whereby a glass sheet may be cut from individual glass blanks conveyed seriatim to a working station that a glass blank may be incorrectly located with respect to the cutting head and the guided movement it is to follow, or the glass blank may have broken angles, or the glass blank may be too small to accommodate the full cutting operation resulting in further lowering movement of the cutting tool in the one direction from the working position and further guided movement in the lowered position. Thus, if the cutting tool for any reason, should drop from the surface of the glass blank, the pressure within the cylinder will maintain the cutting tool in the position to which it shall have dropped, and the cutting tool following the guided movement may run into the edge of the glass blank. Known prior art apparatus have no capability of retracting the cutting tool following such occurence which may result in injury to personnel and damage to the cutting tool.

Accordingly, it is a principal object and an important aspect of the present invention to provide capability in apparatus of the aforementioned type for immediate retraction of the cutting tool from a position below the working position at the cutting plane should the cutting tool for any reason leave the surface of the glass blank. According to the invention, the cutting tool will immediately retract to a waiting position.

DISCLOSURE OF INVENTION

According to the important aspect of the invention, a port is provided in the wall of the cylinder at a height that it normally is covered by the piston when the piston is in the position to locate the cutting tool in the working position. The cutting tool is lowered to the working position by air pressure acting on the piston in opposition to a spring force or other counter-force acting in the other direction. If the cutting tool should move beyond the edge of the glass blank or for any reason drop to a position below the working position under the effect of air pressure acting on the piston, then the port shall open. Such movement may result from a defective or poorly placed glass blank upon which the cutting operation is carried out.

According to the invention, air pressure is communicated to the cylinder for purposes, as described, by a fluid line, and the port provides for immediate venting of the cylinder whereby the piston and the cutting tool retracts to and through the working position to a waiting position. Preferably, the fluid line includes a relay and an operator movable from a first position to a second position to isolate the air pressure from the cylinder and permit venting of both the fluid line and cylinder. Also, the port is in fluid communication with means responsive to the pressure in the cylinder whereby the responsive means upon sensing a surge of pressure when the port is opened causes the operator to move from the first to second position. Retraction of the piston is controlled by the spring force or by another counter-force which may be air pressure. The immediate retraction of the piston and cutting tool prevents damage to the cutting tool and possible injury to personnel.

BRIEF DESCRIPTION OF DRAWING

The FIGURE of drawing illustrates, partially in section, a cutting head for a glass cutting machine and a control for the cutting head which is diagrammatically shown.

BEST MODE FOR CARRYING OUT THE INVENTION

The cutting head of the glass cutting machine, illustrated in the FIGURE, is located above a conveyor (not shown) for moving individual glass blanks 1 seriatim to a working station at which each glass blank is acted upon during a cutting operation. The conveyor may be any form of conveying apparatus as may be conventionally used in the art of glass handling; and the conveyor is suitably supported by frame structure (not shown) which also may be conventional in that art. The cutting head, as disclosed in the previously referred to German publication, for example, may be mounted on cross slides and likewise may be guided along a desired cutting path by a template or by electronic control. The particular manner of mounting the cutting head and the particular control insofar as its guided movement is concerned may be as disclosed in the German publication. Therefore, as may be required for a full and complete disclosure of the means for mounting and guiding the cutting head, the German publication is incorporated herein by reference.

The cutting head is formed by a body 6 including an internal cylinder formed by a bore 6a extending through the body, generally along the longitudinal axis, from one end to the other. A portion of the length of the bore 6a is counterbored as at 6b and a flanged rim 6c provides a surface for receipt of cover 6d. The rim is inwardly beveled throughout a short distance to provide a cavity 6e which communicates with the cylinder although located eccentrically with regard to the longitudinal axis of bore 6a and counterbore 6b. The cover 6d is of a size coextensive with that of the flanged rim 6c and may be secured to the flanged rim 6c by any means as may be conventional. A plurality of bolts received through bores (not shown) in the cover and threaded into the flange rim typically may be used. The manner of securement is depicted by the chain lines which extend through the cover and into the flanged rim.

A piston 5 is located within the counterbored portion of the cylinder and movable in one direction as pressure is exerted on the upper face 12. A rod 4 is carried by the piston. The rod is elongated thereby to extend from the piston through and out of the cylinder at the other end of the body. The rod aside from a portion of its length from the piston is of a diameter substantially equal to the diameter of the bore 6a. The piston, likewise, is of a diameter substantially equal to the diameter of bore 6b for freedom of movement without any substantial binding effect relative to the body.

A cutting tool 2 in the form of a cutting wheel is carried by the rod. A mounting 3 is supported at the end of the rod for this purpose. The mounting is of a type whereby the cutting wheel may have freedom of movement.

As will be discussed below, the piston 5 and the cutting wheel 2, supported by the mounting 3 at the end of rod 4, is movable, that is, lowered toward the glass blank 1 thereby to provide a cut 1a along the path as controlled by the template or electronic control. Lowering movement is controlled by pressure within the cylinder, which pressure is exerted on the upper face 12 of the piston to act in opposition to a force exerted on the lower face of the piston. In the preferred embodiment the force exerted on the lower face is exerted by a spring 7 and atmospheric pressure in communication with bore 6a. The spring is disposed around the rod and supported between a shoulder at the junction of bore 6a and counterbore 6b and the piston. The spring may be a spiral spring and, further, is located within the confines of a collar or thrust bearing 8, also supported within the cylinder at the shoulder.

A bore 9 or a plurality of bores, as desired, are formed in the body within the length of bore 6a thereby to communicate the cylinder to the atmosphere. As illustrated, each bore is located at a position so as not to be closed by the rod when the piston is in position to locate the cutting wheel at the working position illustrated in the FIGURE.

The glass blank 1 may be of any particular outline, although usually it will be rectangular in outline, and the cutting line 1a may follow any particular contour thereby to permit the fashioning of a glass plate suitable for use in an automobile. To this end, the cutting wheel 2 is mounted to have freedom of movement around an axis colinear to the axis of rod 4 and the cutting head, more particularly a supporting carriage (not shown), is guided along the desired path as required by the glass plate to be formed.

A pressure of sufficient magnitude is required to overcome the pressure including atmospheric pressure and the pressure exerted by spring 7 on the lower face of piston 5 and to move piston 5 and cutting wheel 2 to the working position. Preferably, the piston is controlled by air pressure from a source 20. Communication of pressure from the source to the cylinder is provided by a distributor relay 18, conduit 19, valve 22 and a supply circuit connection 24 connecting between the valve and an outlet 25 located within the region of the cavity. In operation, relay 18 is controlled so that air pressure from the source flows as indicated by the arrow (a first condition) into conduit 19 thereby to be communicated to the cylinder by the supply circuit connection between outlet 25 and valve 22. The pressure from the source, as may be read on a pressure meter located downstream of the source, will be sufficient to maintain the ball valve in the illustrated position. Thus, the ball valve will close the valve seat schematically shown to the left to maintain the flow path to the supply circuit connection open. For reasons as will become apparent, a line is provided to connect the supply circuit connection to a point downstream of that valve seat should venting of the fluid line be required. However, during normal operation, a differential pressure exists on opposite sides of the ball valve to maintain the venting valve closed. Thus, pressure from the source is communicated to the upper face 12 of piston 5.

As indicated, an important aspect of the invention concerns the immediate movement or retraction of cutting wheel 2 to a waiting position should the cutting wheel follow a cutting path beyond the outer confines of glass blank 1 or for any reason, or under any circumstance, move from the working position and the cutting plane to a further lowered position. To this end, a port 13 formed by a bore extending through the wall of the body 6 is connected to conduit 14 which, in turn, is connected to a pneumatic contactor 15. Any form of connector as may be conventional for providing a fluid tight seal between the conduit and the bore may be employed.

As illustrated in the FIGURE, port 13 is located in a position slightly below what is the normal location of piston 5 during a cutting operation so that the piston seals the bore. The distance will be such that only minimal movement of the piston is required to enable retraction of the cutting wheel, yet the distance is sufficient to prevent spurious operation. The collar or thrust bearing 8 provides final assurance that the cutting wheel will not strike the conveyor of any other support for the glass blank should the piston for any reason not retract under circumstances that port 13 opens. To this end, total movement capability of the piston from the position illustrated in the FIGURE will be less than the thickness of the glass blank 1 undergoing a cutting operation.

The pneumatic contactor 15 is an electromechanical device capable of generating an electrical signal immediately upon recognition of a pressure rise which shall equal or exceed a threshold value. According to the invention, the conduit 14 is of a length such that the pneumatic contactor will function substantially simultaneously to the sensing of a pressure rise to generate an electrical signal.

The electrical signal generated by pneumatic contactor 15 is communicated or carried by control line 16 to distributor relay 18 to close off or isolate pressure from source 20 to the conduit 19 (a second condition) and simultaneously vent pressure in the conduit to the atmosphere. This operation controls the opening of valve 22 in the compressed air supply circuit with the assist of the line connecting the supply circuit connection downstream of the valve seat. Thus, substantially simultaneously, the cylinder is placed in communication with the atmosphere and spring 7 functions to retract the cutting wheel to the waiting position. The operation is carried out in a fashion that the piston reacts to the condition with the least possible inertia.

It is contemplated that use of the cutting apparatus and movement of the piston between waiting and working positions will result in wear to the walls of the piston to prevent complete closure of bore 13. Thus, a valve 28 is included in conduit 14 thereby to provide a bleed and prevent ant gradual buildup of pressure in conduit 14 which may result in incorrect operation of the pneumatic contactor. The valve may be adjustable to provide any desired level of venting of pressure to the atmosphere under the aforementioned condition and determine the threshold level of operation of the penumatic contactor.

The bore(s) 9 in the body 6 which communicate with bore 6a ensure that a constant pressure may be maintained in the cylinder for operation.

We claim:

1. A cutting head for use in a glass cutting machine comprising a cylinder, a piston adapted for movement in the cylinder in one direction in response to pressure from a source acting on an upper face, the movement of the piston being in opposition to means exerting a continuous force on the piston lower face tending to move the piston in the opposite direction, a rod connected at one end to the piston lower face, a cutting tool mounted on the rod at the other end to provide a cut in a glass blank along a prescribed path, means communicatingthe source of pressure to the cylinder for moving the piston in the one direction thereby to locate the cutting tool in a working position at a cutting plane, and means suppressing the pressure from the source acting on the piston upper face and enabling rapid movement of the piston in the opposite direction under control of the force exerting means should the cutting tool move further in the one direction from the working position.

2. The cutting head of claim 1 wherein the cylinder is a pneumatic cylinder.

3. The cutting head of claim 1 wherein the force exerting means comprises a spring, and including means for locating the spring in the cylinder whereby the spring constantly acts on the piston lower face.

4. The cutting head of claim 1 wherein the cutting tool comprises a cutting wheel, and including means mounting the cutting wheel on the rod for freedom of movement about the axis colinear with the axis of the rod.

5. The cutting head of claims 1, 2, 3 or 4 wherein the means enabling movement of the piston in the opposite direction comprises a port extending through the wall of the cylinder disposed in position thereby normally closed by the piston when the cutting tool is in the working position, and responsive means in close fluid communication with the port thereby to respond substantially immediately upon sensing a surge of pressure from the cylinder at least of a threshold level when the piston moves to open the port, the responsive means functioning to close the communicating means and vent the cylinder wherby the cutting tool moves rapidly in the opposite direction under control of the force exerting means.

6. The cutting head of claim 5 wherein the communication means includes a fluid line connected to the port and a valve in the fluid line whereby pressure from the cylinder below a threshold level is vented to atmosphere.

7. The cutting head of claim 6 wherein the communicating means includes relay means controlled from a first condition for communicating the source of pressure to the cylinder to a second condition for isolating the source of pressure from the cylinder and venting the cylinder, the responsive means when it shall sense pressure at or above the threshold level functioning to control the relay from the first to the second condition.

8. In combination with a glass cutting machine, a cutting head comprising a cylinder, a piston adapted for movement in the cylinder in one direction in response to pressure from a source acting on an upper face, the movement of the piston being in opposition to means exerting a continuous force on the piston lower face tending to move the piston in the opposite direction, a rod connected at one end to the piston lower face, a cutting tool mounted on the rod at the other end to provide a cut in a glass blank along a prescribed path, means communicating the source of pressure to the cylinder for moving the piston in the one direction thereby to locate the cutting tool in a working position at a cutting plane, and means suppressing the pressure from the source acting on the piston upper face and enabling rapid movement of the piston in the opposite direction under control of the force exerting means should the cutting tool move further in the one direction from the working position.

* * * * *